United States Patent
Leshinsky et al.

(10) Patent No.: US 10,229,011 B2
(45) Date of Patent: *Mar. 12, 2019

(54) LOG-STRUCTURED DISTRIBUTED STORAGE USING A SINGLE LOG SEQUENCE NUMBER SPACE

(71) Applicant: Amazon Technologies, Inc., Seattle, WA (US)

(72) Inventors: Yan Valerie Leshinsky, Kirkland, WA (US); James McClellan Corey, Seattle, WA (US); Pradeep Jnana Madhavarapu, Mountain View, CA (US); Anurag Windlass Gupta, Atherton, CA (US); Benjamin Tobler, San Jose, CA (US); Samuel James McKelvie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,331

(22) Filed: Jan. 23, 2017

(65) Prior Publication Data
US 2017/0132091 A1    May 11, 2017

Related U.S. Application Data

(63) Continuation of application No. 14/036,775, filed on Sep. 25, 2013, now Pat. No. 9,552,242.

(51) Int. Cl.
*G06F 11/00* (2006.01)
*G06F 11/14* (2006.01)
(Continued)

(52) U.S. Cl.
CPC .......... *G06F 11/1471* (2013.01); *G06F 3/064* (2013.01); *G06F 3/067* (2013.01);
(Continued)

(58) Field of Classification Search
CPC ... G06F 3/067; G06F 11/1471; G06F 11/1474
See application file for complete search history.

(56) References Cited

U.S. PATENT DOCUMENTS 5,280,612 A    1/1994  Lorie et al.
5,471,614 A    11/1995 Kakimoto
(Continued)

FOREIGN PATENT DOCUMENTS

EP    0675451    10/1995
WO    01/80008   10/2001

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.
(Continued)

*Primary Examiner* — Michael Maskulinski
(74) *Attorney, Agent, or Firm* — Robert C. Kowert; Meyertons, Hood, Kivlin, Kowert & Goetzel, P.C.

(57) ABSTRACT

A distributed database system may implement log-structured distributed storage using a single log sequence number space. A log for a data volume may be maintained in a log-structured distributed storage system. The log may be segmented across multiple protection groups according to a partitioning of user data for the data volume. Updates to the log may be assigned a log sequence number from a log sequence number space for the data volume. A protection group may be determined for an update according to which partition of user data space the update pertains. Metadata to be included with the log record may indicate a previous log sequence number of a log record maintained at the protection group. The log record may be sent to the protection
(Continued)

group and identified as committed based on acknowledgments received from storage nodes implementing the protection group.

20 Claims, 12 Drawing Sheets

(51) Int. Cl.
*G06F 11/07* (2006.01)
*G06F 3/06* (2006.01)

(52) U.S. Cl.
CPC ............ *G06F 3/0619* (2013.01); *G06F 11/00* (2013.01); *G06F 11/0709* (2013.01); *G06F 11/0727* (2013.01); *G06F 2201/805* (2013.01); *G06F 2201/82* (2013.01)

(56) References Cited

U.S. PATENT DOCUMENTS

| | | | |
|---|---|---|---|
| 5,524,205 A | 6/1996 | Lomet et al. | |
| 5,530,850 A | 6/1996 | Ford et al. | |
| 5,870,758 A | 2/1999 | Bamford et al. | |
| 5,907,848 A | 5/1999 | Zaiken et al. | |
| 6,233,585 B1 | 5/2001 | Gupta et al. | |
| 6,240,413 B1 | 5/2001 | Learmont | |
| 6,553,509 B1* | 4/2003 | Hanson | G06F 11/1471 707/E17.007 |
| 6,615,219 B1 | 9/2003 | Bruso et al. | |
| 6,631,374 B1 | 10/2003 | Klein et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,305,386 B2 | 12/2007 | Hinshaw et al. | |
| 7,308,456 B2 | 12/2007 | Friske et al. | |
| 7,415,489 B2 | 8/2008 | Palapudi et al. | |
| 7,472,138 B2 | 12/2008 | Adkins et al. | |
| 7,716,645 B2 | 5/2010 | Dolby et al. | |
| 7,747,663 B2 | 6/2010 | Atkin et al. | |
| 7,809,778 B2 | 10/2010 | Mitaru | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,131,723 B2 | 3/2012 | Sim-Tang | |
| 8,145,838 B1* | 3/2012 | Miller | G06F 11/2023 711/114 |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,397,032 B2 | 3/2013 | Elnozahy | |
| 8,412,689 B2 | 4/2013 | Reid et al. | |
| 8,412,752 B2 | 4/2013 | Dodge | |
| 8,429,121 B2 | 4/2013 | Pareek et al. | |
| 9,552,242 B1 | 1/2017 | Leshinsky et al. | |
| 2002/0107835 A1 | 8/2002 | Coram et al. | |
| 2002/0143733 A1 | 10/2002 | Mukkamalla et al. | |
| 2003/0046121 A1 | 3/2003 | Menninger et al. | |
| 2004/0133622 A1 | 7/2004 | Clubb et al. | |
| 2004/0249869 A1 | 12/2004 | Oksanen | |
| 2005/0262161 A1 | 11/2005 | Holmes et al. | |
| 2005/0283504 A1* | 12/2005 | Suzuki | G06F 11/2025 |
| 2008/0162591 A1 | 7/2008 | Ganotra et al. | |
| 2008/0168081 A1 | 7/2008 | Gaurav et al. | |
| 2008/0183973 A1 | 7/2008 | Aguilera et al. | |
| 2008/0208924 A1 | 8/2008 | Bradshaw et al. | |
| 2009/0024551 A1 | 1/2009 | Agrawal et al. | |
| 2009/0193393 A1 | 7/2009 | Baldwin et al. | |
| 2010/0050172 A1 | 2/2010 | Ferris | |
| 2010/0192131 A1 | 7/2010 | Dolby et al. | |
| 2010/0232288 A1* | 9/2010 | Coatney | G06F 11/2033 370/221 |
| 2011/0035548 A1 | 2/2011 | Kimmel et al. | |
| 2011/0161496 A1 | 6/2011 | Nicklin | |
| 2011/0251997 A1 | 10/2011 | Wang et al. | |
| 2012/0041899 A1 | 2/2012 | Greene et al. | |
| 2012/0054447 A1 | 3/2012 | Swart et al. | |
| 2012/0143825 A1 | 6/2012 | Boehm et al. | |
| 2012/0174112 A1 | 7/2012 | Vaidya et al. | |
| 2012/0191648 A1 | 7/2012 | Kuber et al. | |
| 2012/0297073 A1 | 11/2012 | Glover et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2012/0317382 A1 | 12/2012 | Steed | |
| 2013/0036281 A1 | 2/2013 | Revah et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2015/0058306 A1* | 2/2015 | Earl | H04L 67/1097 707/703 |
| 2016/0350013 A1* | 12/2016 | Aron | G06F 3/06 |

OTHER PUBLICATIONS

"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.
Jim Czuprynski "Oracle Database 11g: SQL Query Result Set Caching" published Jul. 30, 2008, downloaded May 15, 2013 from http://www.databasejournal.com/features/oracle/article.php/3760761/Oracle-Database-11 g-SQL -Query-Result-Set-Caching.htm, pp. 1-7.
"Oracle Database JDBC Developer's Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.
Adrian Billington "Query Result Cache in Oracle 11g" downloaded from http://web.archive.org/web/20080124161135/ http://www.oracle-developer.net/display.php?id=503 via the Wayback Machine Jan. 4, 2008, pp. 1-20.
Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.
Michele Cyran et al "Oracle Database Concepts 10g Release 2 (10.2)" Oct. 2005, pp. 1-542.
Lance Ashdown et al "Oracle Database Concepts 11 g Release 2 (11.2)" Sep. 2011, pp. 1-460.
"Isolation (database systems)" downloaded from http://en.wikipedia.org/wiki/Isolation_(database_systems) on May 15, 2013, pp. 1-7.
U.S. Appl. No. 14/070,362, filed Nov. 1, Samuel James Mckelvie.
U.S. Appl. No. 14/070,355, filed Nov. 1, Samuel James Mckelvie.
U.S. Appl. No. 14/070,350, filed Nov. 1, Samuel James Mckelvie.
U.S. Appl. No. 14/070,347, filed Nov. 1, Samuel James Mckelvie.
Adrian Proctor "Non-Volatile Memory: Non Volatile Memory and its use in Enterprise Applications" 2012 whitepaper downloaded from http://www.vikingtechnology.com/sites/default/files/featuredvideos/NVDIMM_Technology.pdf, pp. 1-8.
U.S. Appl. No. 13/872,530, filed Apr. 29, 2013; Samuel James Mckelvie.
Yuan Xie "Emerging NVM Memory Technologies", Penn State Department of Computer Science and Engineering, Downloaded from http://web.engr.oregonstate.edu/~sllu/xie.pdf on Aug. 13, 2013, pp. 1-31.

(56) References Cited

OTHER PUBLICATIONS

NV-DIMM: Fastest Tier in Your Storage Strategy, 2012 Whitepaper, Viking Technology, pp. 1-7.
U.S. Appl. No. 13/967,185, filed Aug. 14, 2013, Anurag Windlass Gupta.
BM, "Storage Class Memory : Towards a Disruptively Low-Cost Solid-State Non-Volatile Memory", Almaden Research Center; Jan. 2013, pp. 1-27.
GitHub-Gist, "Latency Numbers Every Programmer Should Know", pp. 1-6.
Technology Lab/ Information Technology, Sean Gallagher, "Memory That Never Forgets: Non-Volatile DIMMS Hit the Market", Apr. 4, 2013; pp. 1-3.
U.S. Appl. No. 14/070,359, filed Nov. 1, Samuel James Mckelvie.

\* cited by examiner

LOG-STRUCTURED DISTRIBUTED STORAGE USING A SINGLE LOG SEQUENCE NUMBER SPACE

BACKGROUND

This application is a continuation of U.S. patent application Ser. No. 14/036,775, filed Sep. 25, 2013, now U.S. Pat. No. 9,552,242, which is hereby incorporated by reference herein in its entirety.

Data storage systems have implemented many different storage schemes for efficiently and reliability persisting data. Storage schemes implemented on a distributed system architecture are often deployed when storage system client applications, such as database systems, require greater availability of the data persisted in the data storage system. Common solutions to making data available including storing one or more versions or replicas of data on multiple storage nodes. However, by increasing the number of versions or replicas, the complexity and operational costs for maintaining a consistent view of persisted data increases. Synchronization protocols are used to ensure consistency when changes are made to the versions or replicas of data across the storage node. However, typical synchronization protocols often increase the time and resources required to perform the change consistently. The costs to maintain a consistent view in the data storage system can dull the very advantages of implementing the distributed storage system.

Figure 1:
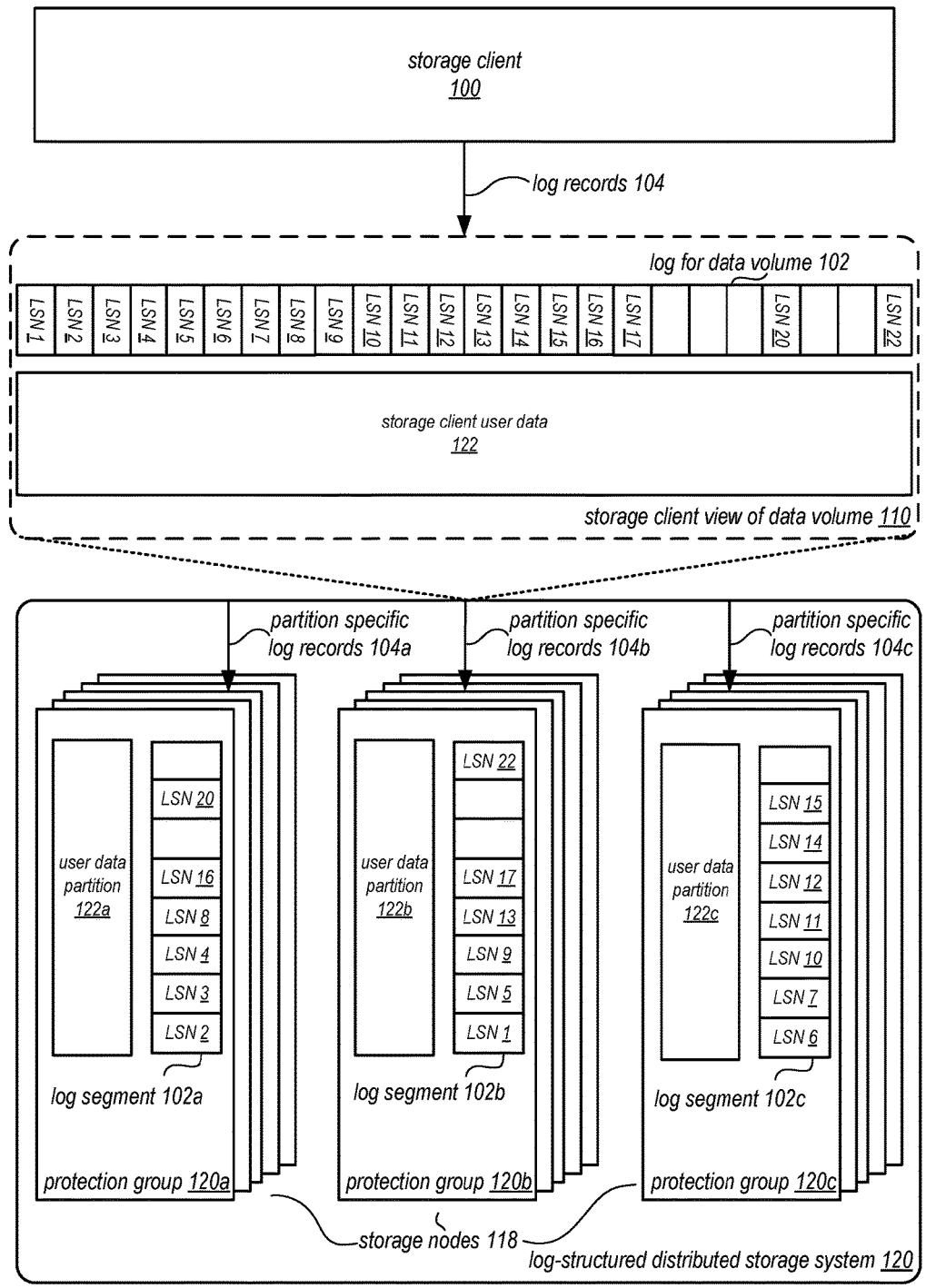
FIG. 1 is a block diagram illustrating log-structured distributed storage using a single log sequence number space, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of log-structured distributed storage using a single log sequence space are described herein. A log-structured distributed storage system may segment log storing updates for storage client data volume across multiple protection groups. These protection groups may be implemented by multiple storage nodes providing redundant storage of portions of the log and user data space of the data volume partitioned among the protection groups. Distributed storage increases data availability for access requests from a storage system client. Read requests, for example, may be made to one or more of the storage nodes in order to read data. Write requests, or updates, to the data may also be made. These write requests may need to be made consistent across the storage nodes storing the data so that read requests to different storage nodes do not return stale or erroneous data.

In at least some embodiments, log-structured distributed storage may provide consistent views of a data volume stored for a storage client. Different partitions of a user data space of the data volume may be stored among different protection groups. The log storing updates to the user data may be segmented according to this partitioning of user data space. A log segment pertaining to a partition of user data may be co-located with the partition of the user data at a same protection group. As new updates or changes are added to the log, a log record indicating the update or change may be sent to the protection group which maintains the partition of user data to which the update pertains. The log record may be maintained at the protection group along with other log records segmented to the protection group also corresponding to changes pertaining to the partition of user data at the protection group. Thus, when performing access or other operations with regard to a partition of user data, log records for the partition may already reside at the protection group sufficient to perform the operation (e.g., generate a current or prior version of a user data page for a read request).

Although the log is segmented across different protection groups according to the respective partitions of the user data of the data volume maintained at each protection group, consistency of the log may be maintained across the log by using a single log sequence number space, in various embodiments. As log records indicating updates or changes are generated, a log sequence number from a common log sequence number space may be assigned to the log record. A log sequence number space may, in some embodiments, be a monotonically increasing number space. Assignments from the number space may be sparse (e.g., 1, 7, 16, 23, 25, etc . . . ) in some embodiments, contiguous (e.g., 1, 2, 3, 4, 5, etc . . . ) in some embodiments, or some combination of both. Metadata may also be included with log records that indicates a previous log sequence number of a log record maintained at the same protection group. In some embodiments, metadata may also indicate a previous log sequence number in the log sequence number space which may be maintained at any one of the protection groups across which the log is segmented.

Metadata included with the log record may be such that a position in a recovery sequence for the protection group and the log sequence number space may be identifiable. A recovery sequence for each protection group may allow each protection group to be independently recoverable, without reference to another protection group. However, using the log sequence number space, dependencies across the multiple protection groups between data pages (e.g., such as changes made to different portions of user data as part of a user transaction in a database system) may be kept consistent. Thus, distributed log-structured storage may reduce the latency in operations to consistently persist updates to the data volume in the log, as well as reducing overhead operational costs. Log records may be identified as committed to the log for the entire data volume, without being persisted among multiple protection groups or performing a two-phase commit, in some embodiments.

Typically, consistency mechanisms for distributed systems, such as distributed storage systems, include one or more different steps that are performed during the workflow to make a change or perform an operation at a distributed storage system. For instance, one common synchronization method is a two-phase commit. A two-phase commit, typically implements a transaction coordinator system by first, sending a commit request message to nodes in the distributed system. Each node must then respond back with an agreement message to commit. Once agreement is received from all of the storage nodes, a commit message to perform the requested operation or make the requested change is sent to each node, and then each node must respond with an acknowledgment. Finally, upon receiving an acknowledgment from all of the nodes, the operation or change may be considered durable and consistent (i.e. committed) across the distributed system. Other synchronization protocols introduce similar or more complicated synchronization schemes, such as the Paxos algorithm or three-phase commit protocol. While each of these, and other synchronization techniques, ensure consistency in a distributed system, devices, systems, applications or other clients of a distributed system that perform operations or make changes in the distributed storage system may have to perform many different steps, utilizing more system resources and increasing latency for performing operations.

In an alternative method for ensuring consistency, some typical systems distribute log records among different nodes or groups of nodes in a distributed system. However, these systems send log records to storage nodes according to time, such as by striping log records across different storage nodes or storing ranges of log sequence numbers together. When providing access to data described by logs distributed in this way, the entire log may still have to be read to perform access or other operations (such as recovery), increasing latency for performing operations.

In various embodiments, log-structured distributed storage using a single log sequence number space may ensure consistent views of a data volume stored for a storage client while reducing latency and operational costs for committing changes to the data volume. In various embodiments, updates or changes to the data volume stored at log-structured distributed storage may be committed to the log for the data volume when committed to a particular protection group to which the partition of user data space the update pertains. As noted above, log records may be sent to a protection group with metadata indicating a previous log sequence number of a log record maintained at the protection group. In this way, each protection group may, in at least some embodiments, be independently recoverable by evaluating this metadata for log records maintained at the protection group. FIG. 1 is a block diagram illustrating log-structured distributed storage using a single log sequence space, according to some embodiments.

A storage client 100 may utilize log-structured distributed storage system 120 to store data volume 110 for storage client 100, or another system, device, or application that is itself a client of storage client 100. Storage client 100 may be one of various systems, applications, or devices configured to access data volume 110. In at least some embodiments, storage client 100 may be a database system, such as a distributed database system. In order to update data volume 110, storage client 100 may send log records 104 indicating changes to log-structured distributed storage system 120. Different types of log records may be sent that may indicate changes to data and/or metadata at the log-structured data store. For example, for a storage client that is a database the different types of log records may include redo records, undo records, transaction table entries, etc . . . . In at least some embodiments, the single log sequence number space for the log-structured distributed storage may be the same log sequence number space for database log records (when the storage client is a database system), such as those used to implement write-ahead logging and other database techniques. As various log record types for log-structured data stores are well-known to those of ordinary skill in the art, the previous examples are not intended to be limiting.

As noted above, a log 102 for data volume 110 may be maintained. From storage client's 100 perspective and/or the perspective of a client of storage client 100, log 102 may appear to be a single log 102 indicating updates to storage client user data 122. Log records in log 102 may have log sequence numbers from a log sequence number space, and may be ordered according to the log sequence numbers in the log sequence number space. FIG. 1 illustrates, for instance, LSN 1 occurring before LSN 2, LSN 2 occurring before LSN 3, and so on for log records LSN 1-LSN 22. In some embodiments, updates to log 102 may processed asynchronously. Therefore a log record 104 may be sent be included in log 102, and then a next log record 104 may be sent to be included in log 102, before receiving an acknowledgment that the first log record has been committed to the log. Thus, log records in some embodiments some log records may arrive before or be committed before other log records, hence the illustrated gaps between LSN 17, LSN 20, and LSN 22.

While storage client's 100 view of data volume 110 may appear to be a single log 102 and user data 122, log-structured distributed storage system 120 may segment the log across multiple protection groups. For example, FIG. 1 illustrates 3 protection groups, 120*a*, 120*b*, and 120*c*, which store different segments of the log 102, such as log segment 102*a*, 102*b*, and 102*c*. Each protection group may be implemented by a plurality of storage nodes 118, systems, or devices, such as computing system 1200 described with regard to FIG. 12 below. Also maintained at each protection group 120*a*-120*c*, is a user data partition, such as user data partitions 122*a*, 122*b*, and 122*c*. A user data partition may be a range of user data 122, such as a byte range, page range, etc. However, various other partitioning arrangements of user data 122 may be envisioned, and therefore, the previous examples are not intended to be limiting.

FIG. 1 illustrates that partition specific log records may be sent to and maintained at specific protection groups. Log records 104*a* indicating updates to user data partition 122*a* may be sent to protection group 120*a* to be maintained. Likewise, log records 104*b*, and 104*c* indicating updates to user data partition 122*b* and 122*c* respectively may be sent to protection group 120*b* and 120*c*. Thus, in some embodiments, in response to receiving an update to log 102, a protection group according to which the update pertains may be determined. Metadata may be generated to be included with the log record, in at least some embodiments, that indicates a log sequence number of a previous log record maintained at the determined protection group such that a position in a recovery sequence for the protection group and a position in the log sequence number space are identifiable. The log record, and attendant metadata, may then be sent to the determined protection group, as illustrated in FIG. 1. In some embodiments, based, at least in part, on acknowledgments received from storage nodes 118 implementing a protection group to which the log record is sent, the log record may be identified as eligible for durability to log 102.

Segmenting the log records of log 102 in this way my lead to two different observations. First, each protection group may have its own respective log, with an ordering that is not identifiable based on the LSN of a log record alone. For example, log segment 102*a* stores log record LSN 2, LSN 3, LSN 4, and LSN 8. LSNs 5, 6, 7 are located on other protection groups, so protection group 120*a* may need to determine whether or not it is missing a log record (such as when participating in recovery). Thus, metadata, either maintained in the log records or collectively somewhere else in the protection group, may indicate previous log sequence numbers for each log record. In this way, a recovery sequence or ordering for log records may be identifiable so that missing log records may be determined. Moreover, access operations for data in the user data partition may be performed at the protection group without a need to obtain log records in the log for the data volume from other protection groups. Metadata for LSN 8 indicates, for instance, that LSN 4 is the previous log record to LSN 8 at protection group 120*a* (and thus no gap is illustrated). LSN 20, however, may indicate that LSN 18 is the previous log record, which has not been persisted at protection group 120*a* (thus a gap is illustrated).

A second observation, log records that are dependent on another log record (e.g., as part of a system or user transaction in a database system) may be maintained at different protection groups. If, for instance, LSN 16 is dependent on LSN 15 in order to indicate changes to user data 122, protection group 120*a* may be unaware of whether or not LSN 15 is actually committed to log 102. In some embodiments, metadata maintained for each log record may indicate these dependencies on other log records, such as by indicating a previous LSN of a log record in the log sequence number space.

In addition to these observations, it may also be noted that log records may be segmented across the protection groups without striping the log records, or storing the log records according to different ranges at each protection group. For example, each log segment 102*a*, 102*b*, and 102, stores at least one log record with an LSN between the ranges of 6 and 15.

Figure 9:
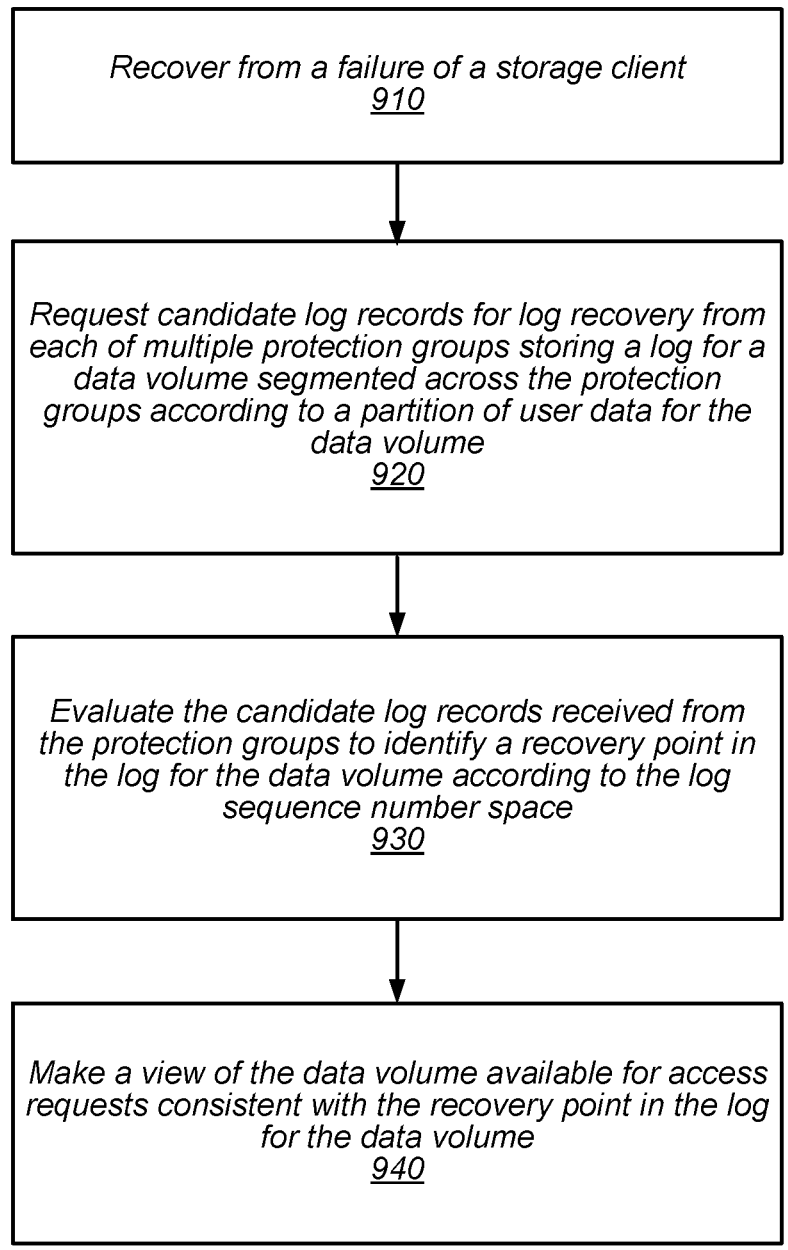
FIG. 9 is a high-level flowchart illustrating a technique for recovery in log-structured distributed storage using a single log sequence number space, according to some embodiments.
Figure 10:
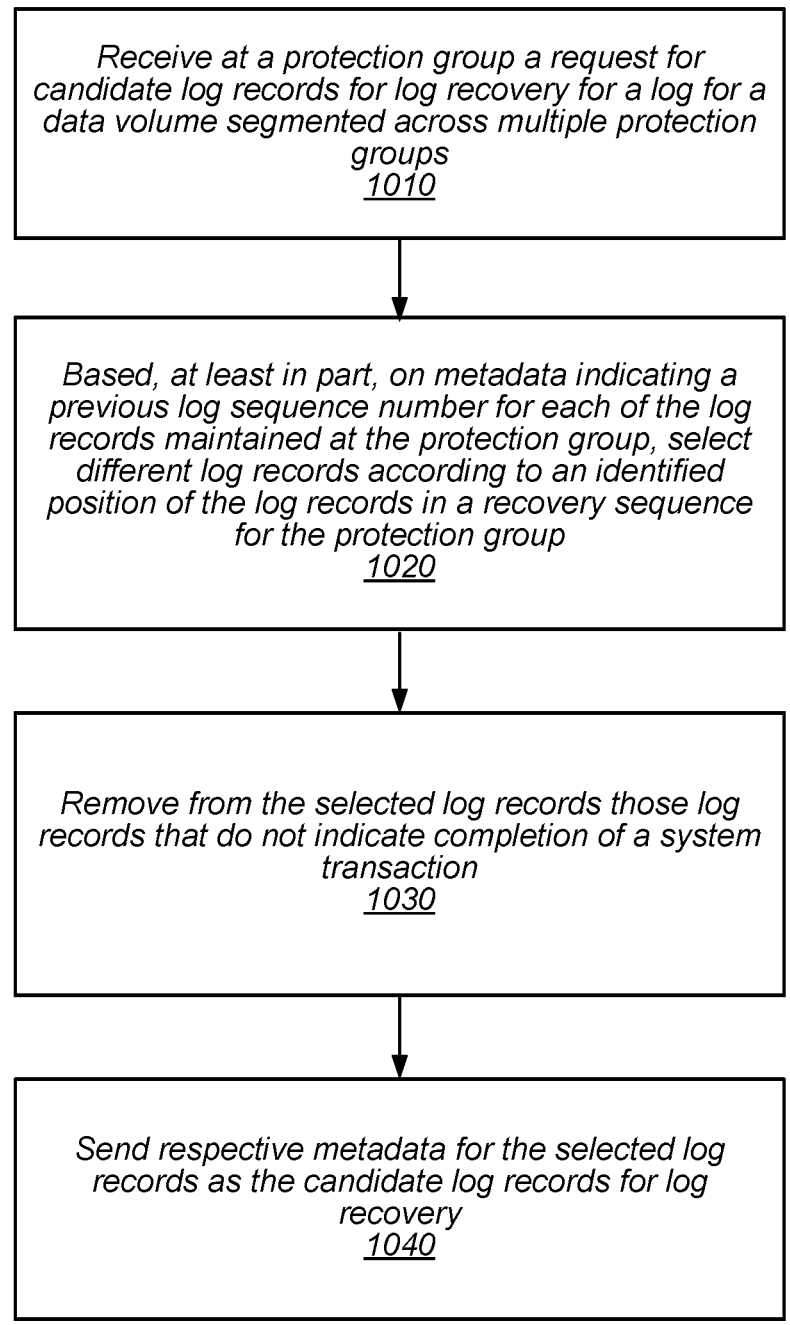
FIG. 10 is a high-level flowchart illustrating a technique for selecting candidate log records for log recovery, according to some embodiments.
Figure 11:
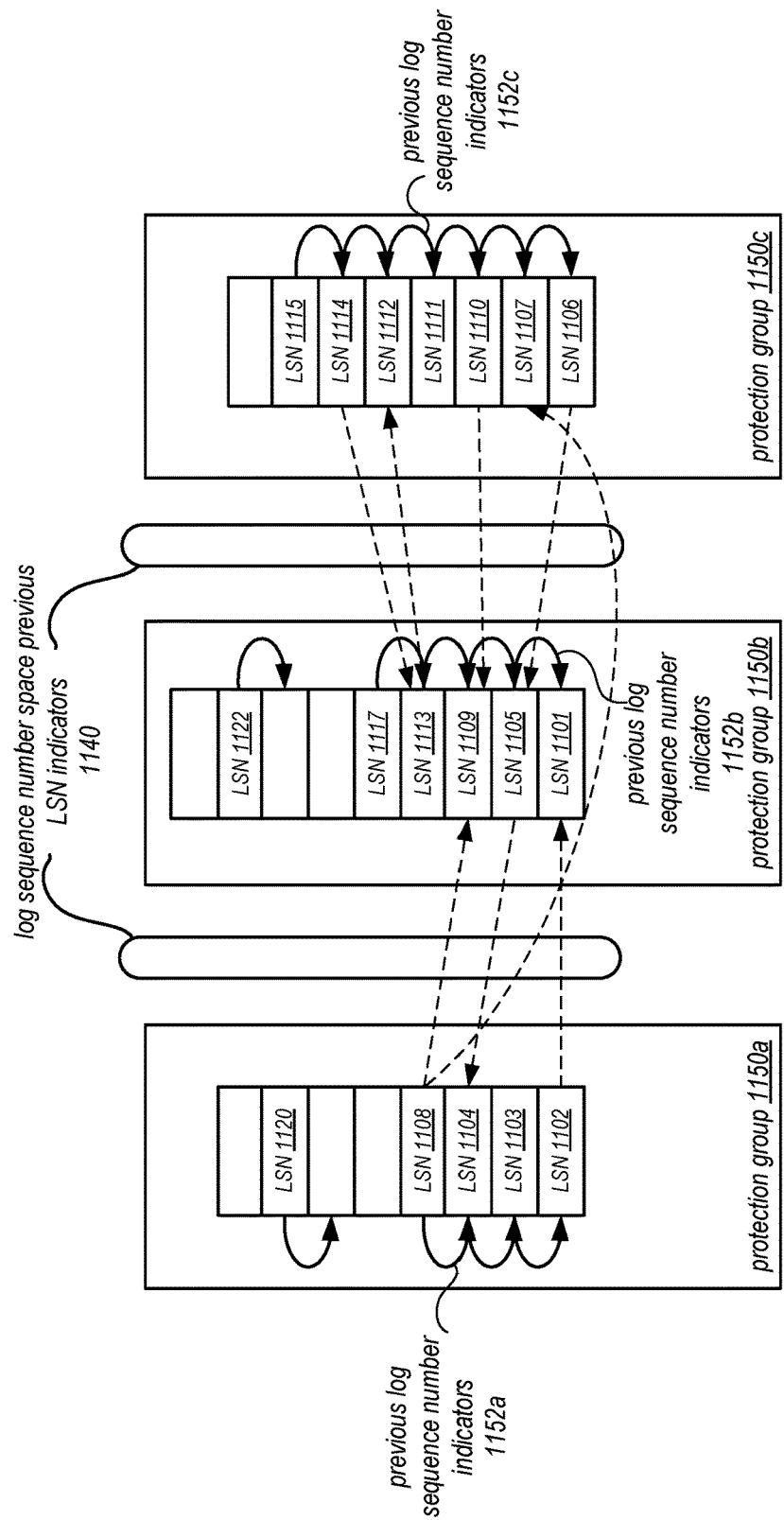
FIG. 11 is a block diagram illustrating a log segmented according to partitions of user data space in log-structured distributed storage, according to some embodiments.

An effect of segmenting log records across protection groups according to user data partitions is that each protection group may be recovered independently, without reference to other protection groups. Recovery may also be performed in parallel or near parallel at each protection group. Recovery may mean determining for a storage client that has failed and restarted (or a new storage client replacing an old/failed storage client) the committed state of data volume 110. Part of recovery may involve determining a recovery point in the log 102 for data volume 110. The recovery point may be the last committed log record acknowledged to client 100 with no missing or incomplete log records, or a last durably persisted log record (which may not have been identified as committed to client 100 even though it is durably persisted), indicating a consistent view of the data volume 110 from which the client 100 may continue to operate. LSN 17 is an example of a committed log record that is complete with no missing prior log records upon which LSN 17 (or another log record) may be dependent. As part of determining the recovery point for log 102, each protection group may be able to determine a completion point for log records in the log segment maintained at the protection group based on metadata (discussed above) maintained for the log records indicating the previous LSN of a log record at the protection group. Candidate log records for the recovery point may be determined at protection groups according to the completion point and/or metadata maintained for the log records and sent to a recovery coordinator or client to determine the log recovery point. FIGS. 9-11 discuss related techniques to implement recovery for storage client 110 in greater detail below, and thus, the previous discussion is not intended to be limiting.

Please note, FIG. 1 is provided as a logical illustration of a log-structured distributed storage system using a single log sequence number space, and is not intended to be limiting as to the physical arrangement, size, or number of components, modules, or devices, implementing a distributed storage system. For example, the number of protection groups may vary. Different numbers of storage nodes or devices implementing protection groups may change, as well as the respective partitions of user data, segmentations/orderings of log etc.

The specification first describes an example of a log-structured distributed storage using a single log sequence number space system, according to various embodiments. The example log-structured distributed storage service may store data for many different types of clients, in various embodiments. One such client may be a network-based database service, described in further detail below. Included in the description of the example network-based database service are various aspects of the example network-based database service along with the various interactions between the database service and the log-structured distributed storage service. The specification then describes a flowchart of various embodiments of methods for implementing log-structured distributed storage using a single log sequence space. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume. For example, in some embodiments, in response to a request to make a change to a database, the client-side driver may be configured to determine the protection group, and its one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
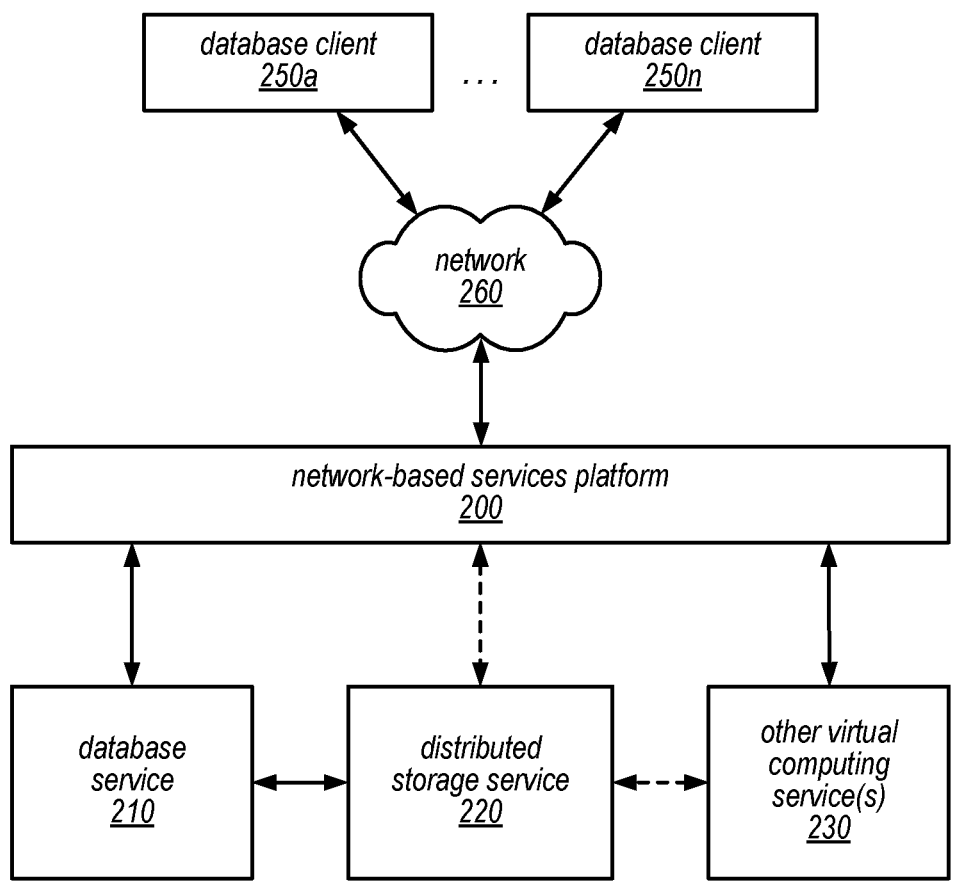
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. Distributed storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and /or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
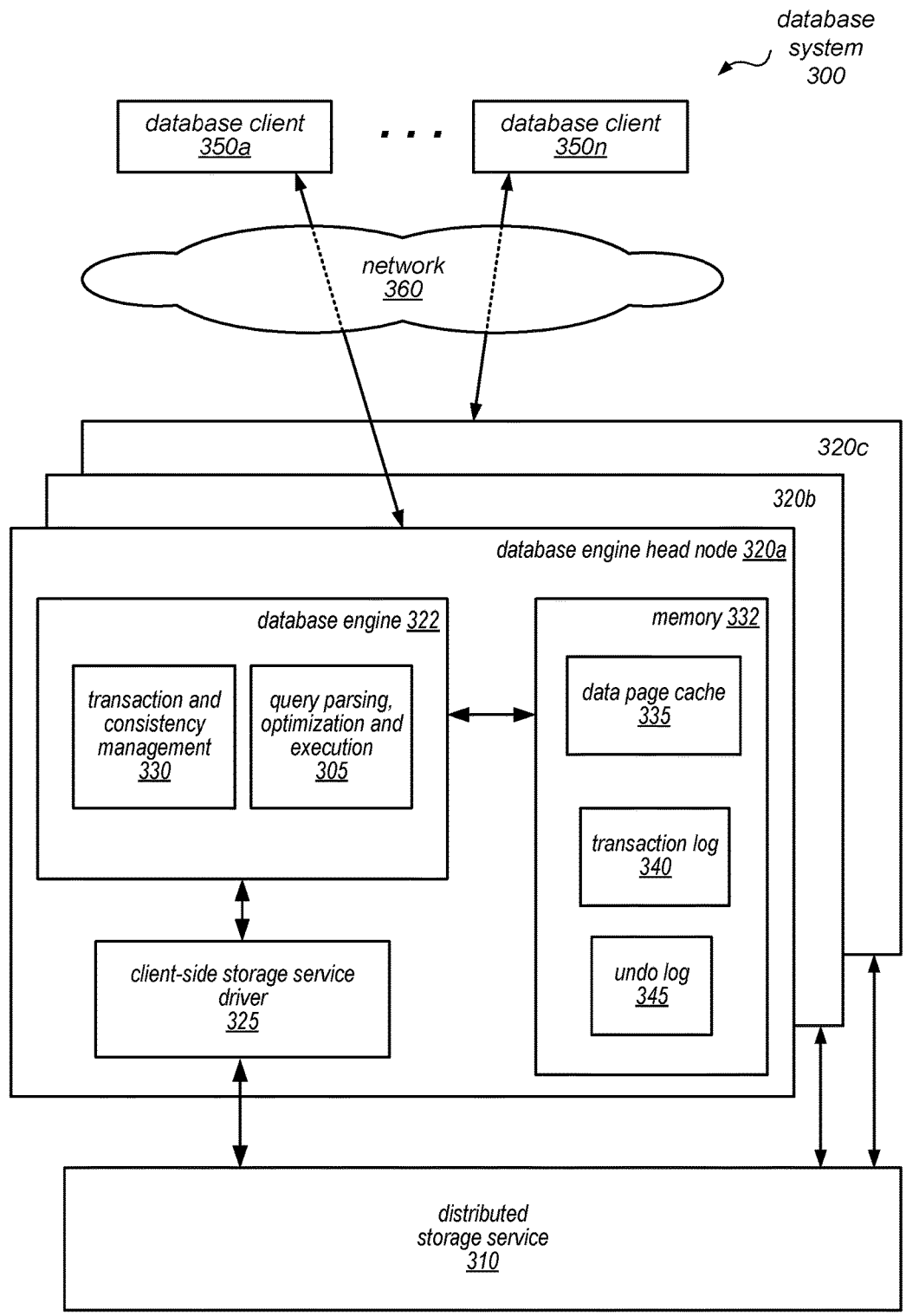
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store a database volume (such as data pages of one or more databases, as well as redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a). Client-side storage device may maintain mapping information about the database volume stored in distributed storage service 310, such that a particular protection group maintaining a partition of the database volume may be determined. Read requests and redo log records may then be routed to storage nodes that are members of the protection group according to the partition of user data to which the read request is directed or to which the redo log record pertains.

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical volumes, extents (which may include partitions of the user data space in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the distributed storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space. Control Log Records (CLRs), which are generated by the storage system, may also contain control information used to keep track of metadata such as the current unconditional volume durable LSN (VDL). Null Log Records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
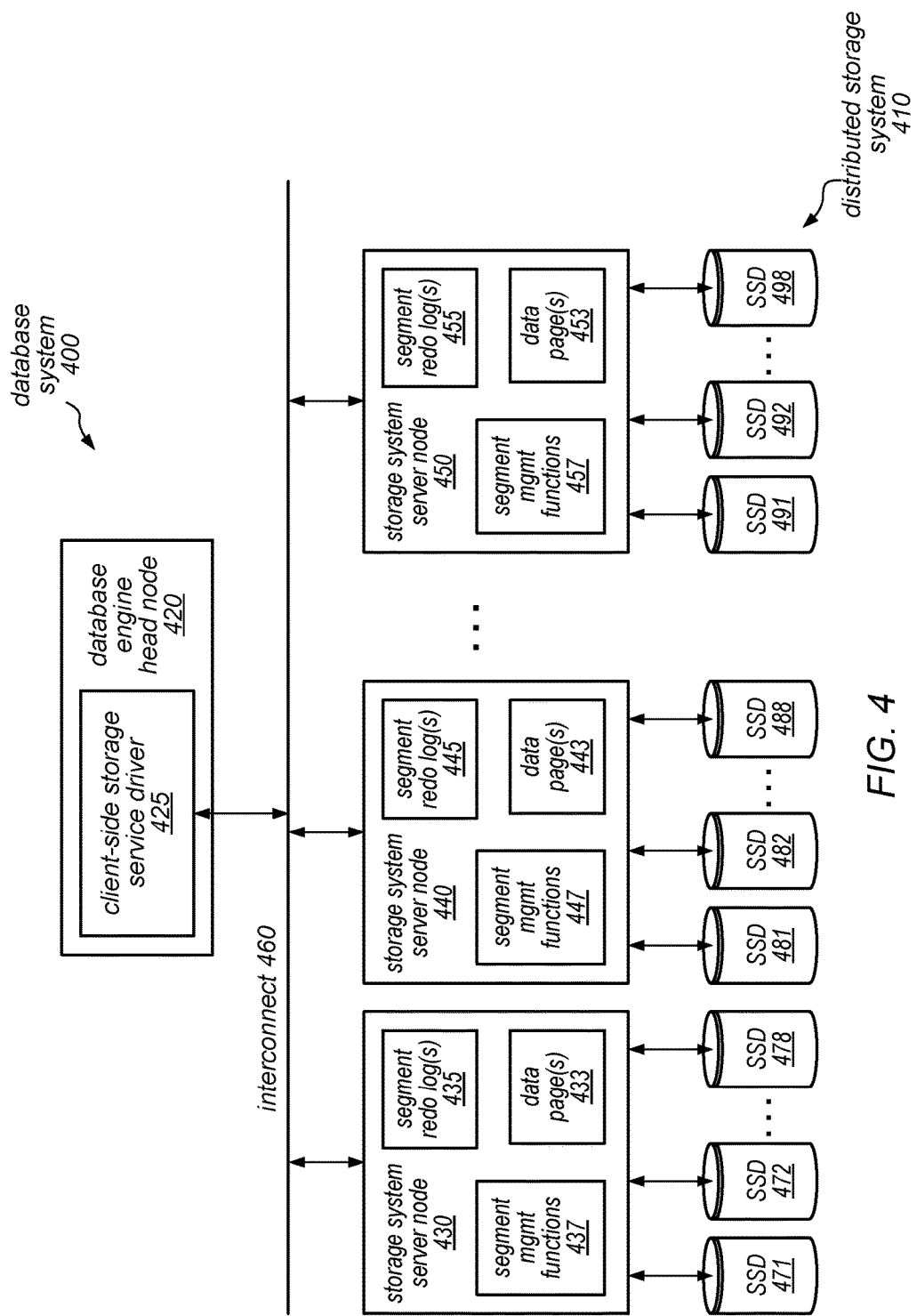
FIG. 4 is a block diagram illustrating a distributed storage system, according to some embodiments.

One embodiment of a distributed storage system is illustrated by the block diagram in FIG. 4. In at least some embodiments, storage nodes 430-450 may store data for different clients as part of a multi-tenant storage service. For example, the various segments discussed above and below with regard to FIG. 7, may correspond to different protection groups and volumes for different clients. As noted above, some storage nodes may perform garbage collection independent from other storage nodes. Consider the scenario where a storage node maintains data for two different clients. One client's data may be actively accessed/modified, causing the log structure for that data to grow quickly. Though, the other data maintained for the other client may be accessed infrequently, garbage collection may be performed to reclaim log pages associated with the other data in order to make more data pages available for the more active log.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Distributed storage system 410 may also implement a storage control plane. Storage control plane may be one or more compute nodes configured to perform a variety of different storage system management functions. For example, storage control plane may implement a volume manager, which may be configured to maintain mapping information for a volume as it is persisted in varying different, extents, segments, and protection groups. A volume manager may be configured to communicate with a client of storage system 410, such as client-side driver 425 in order to "mount" the volume for the client, providing client-side driver 425 with mapping information, protection group policies, and various other information necessary to send write and read requests to storage nodes 430-450.

Storage control plane may also implement a recovery module or service for storage system clients, such as database system 400. For example, the various methods and techniques described below with regard to FIGS. 9-11 may be performed, request, or coordinated by the recovery module.

Client-side storage service driver 425 may also implement various recovery techniques for distributed storage system 410, such as those discussed below in FIGS. 9-11. For example, upon recovery from a failure of database engine head node 420, CSD 425 may determine and provide a recovery point from which database engine head node 420 may access a consistent view of the database volume stored in distributed storage system 410. In order to determine the recovery point for the log, CSD 420 may request candidate redo log records from each protection group maintaining an extent of a database volume. For instance, one or more storage nodes of each protection group may be sent the request. Storage system server node 430, for example, may receive the request for candidate log records for log recovery of the log for the database volume.

Using metadata maintained in an in-memory data structure, or by reading metadata in the log records stored at the storage node 430 that indicates previous log sequence numbers of log records also maintained at the protection group, different log records may be selected according to an identified position of the log records in a recovery sequence for the protection group. For instance, the recovery sequence may be determined from the metadata of previous LSNs, and indicate a chain or ordering of log records that are maintained at the protection group. By traversing the chain to find the first break or gap in the log records, the log record in the chain prior to the gap may be a completion point for the protection group. Log records above the completion (and the gap) may not be durably persisted among the segments in the protection group (e.g., may not satisfy a write quorum for the PG) and may not be eligible for selection as a candidate log record for log recovery. LSNs below the completion point may be eligible. Eligible log records may filtered down to a smaller subset of log records. In some embodiments, a storage node, such as storage node 430 may filter or remove log records that do not indicate completion of a system transaction (i.e., they are log records indicating a change in the middle of a system transaction) from selected candidate. Metadata about a the protection group or a volume, such as the current unconditional volume durable LSN (VDL), may be used to filter the eligible log records. For example, in some embodiments, all log records with LSNs below the current unconditional volume durable LSN (VDL) may be excluded. The candidate log records for log recovery may be sent back to client-side driver 425.

Client-side driver 425 may then evaluate the candidate log records received from the protection groups to identify the recovery point in the log for the database volume according to the log sequence number from LSNs are assigned. For example, starting from the candidate log record with the lowest LSN, the log records may be traversed until reaching the first break in the sequence. The log record before the first break, may be identified as the recovery point for the log. FIGS. 9-11 discuss in greater detail the various methods and techniques that a client-side driver or other system module or device may implement recovery for a log-structured distributed storage system using a single log sequence number space, and as such the previous discussion is not intended to be limiting.

Figure 5:
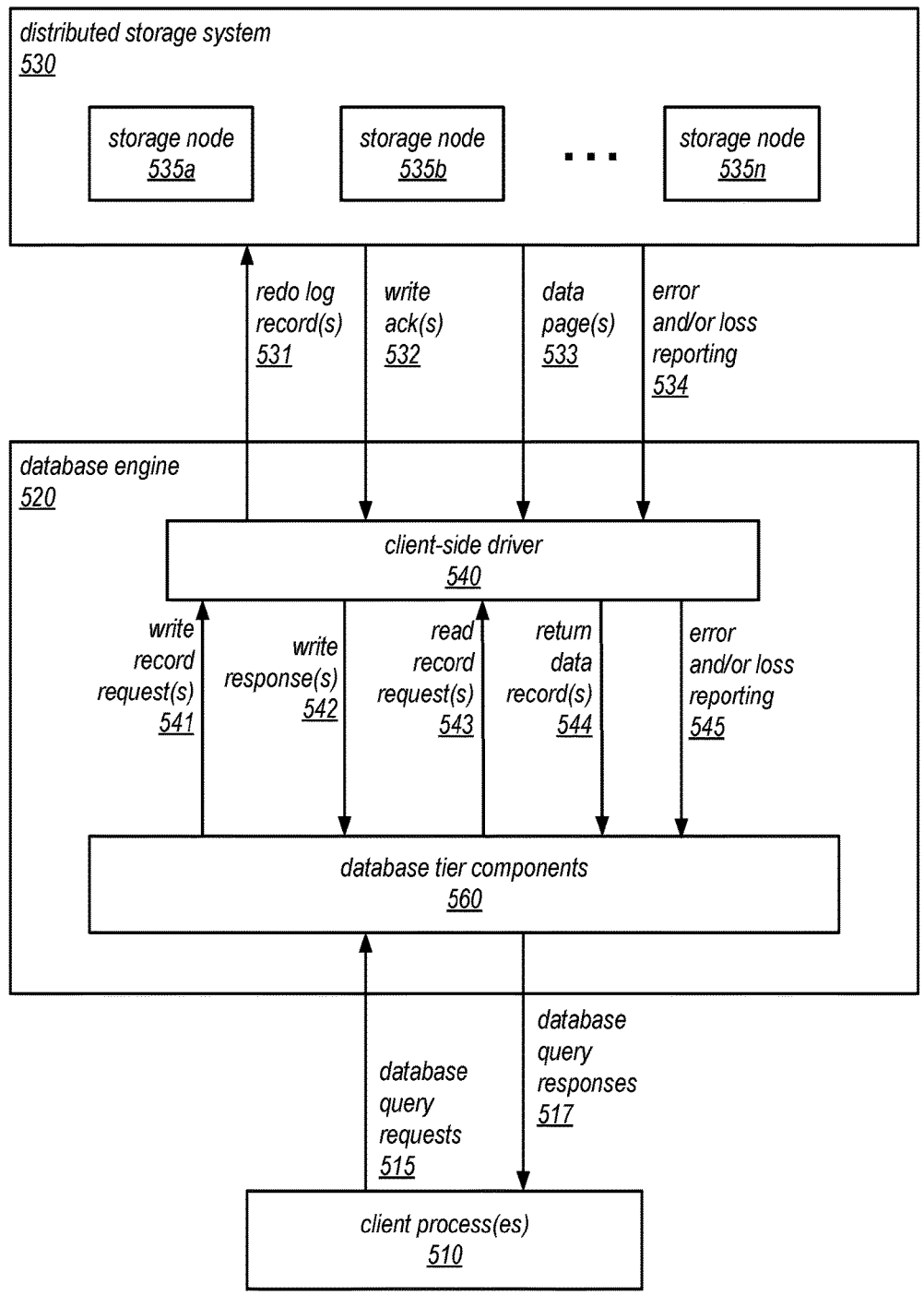
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in distributed storage system 530. Client-side driver 540 may generate metadata for each of the redo log records that includes an indication of a previous log sequence number of a log record maintained at the specific protection group. Distributed storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
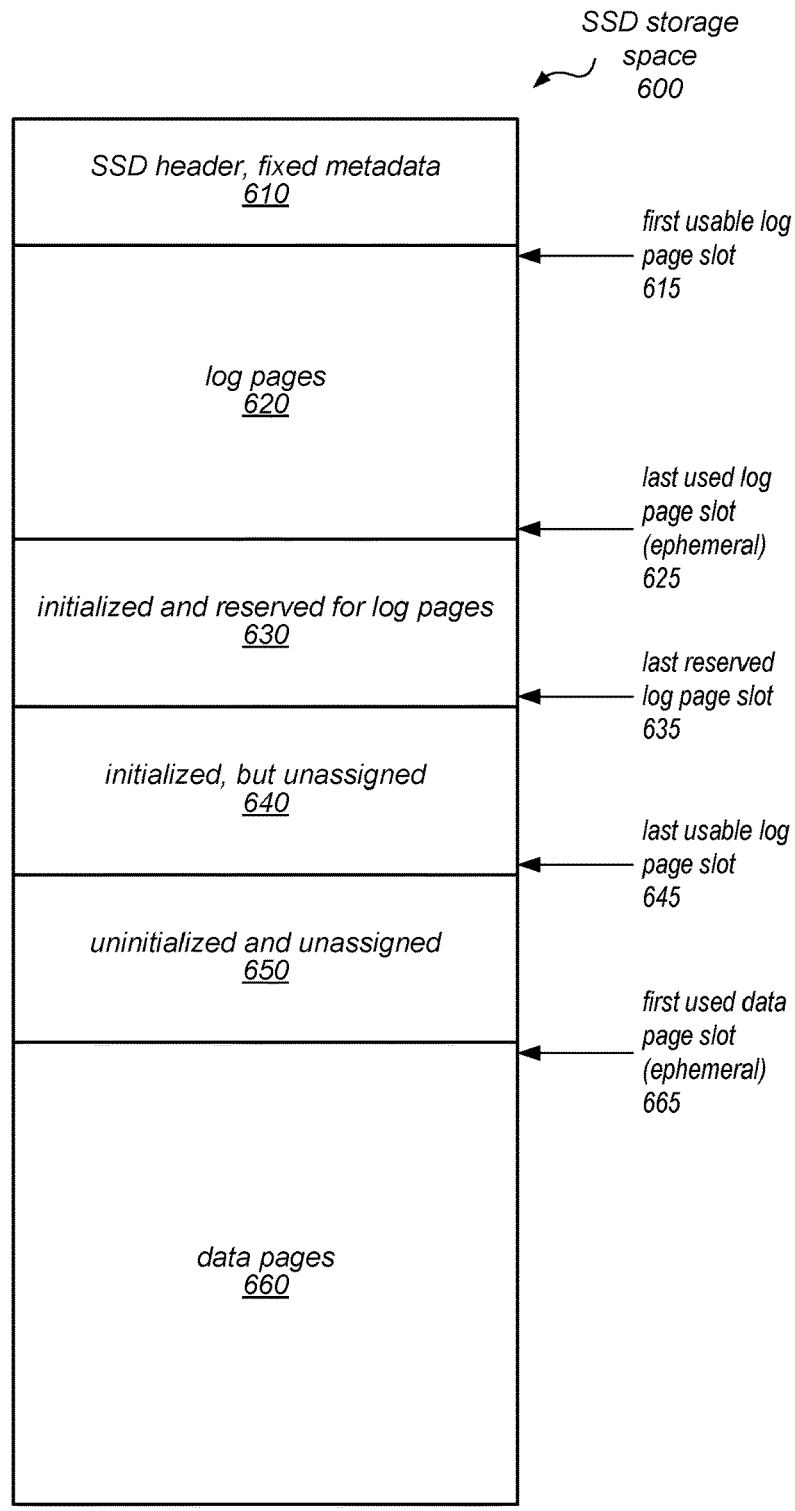
FIG. 6 is a block diagram illustrating how data and metadata may be stored on a storage node of a distributed storage system, according to some embodiments.

FIG. 6 is a block diagram illustrating how data and metadata may be stored on a given storage node (or persistent storage device) of a distributed storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640) is initialized, but unassigned, and another portion of the space (shown as 650) is uninitialized and unassigned. Finally, the portion of SSD storage space 600 labeled 660 stores data pages.

In this example, the first usable log page slot is noted as 615, and the last used log page slot (ephemeral) is noted as 625. The last reserved log page slot is noted as 635, and the last usable log page slot is noted as 645. In this example, the first used data page slot (ephemeral) is noted as 665. In some embodiments, the positions of each of these elements (615, 625, 635, 645, and 665) within SSD storage space 600 may be identified by a respective pointer.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 6, the current log page slot pool includes the area between the first usable log page slot (at 615) and the last reserved log page slot (625). In some embodiments, this pool may safely grow up to last usable log page slot (625) without re-initialization of new log page slots (e.g., by persisting an update to the pointer that identifies the last reserved log page slot, 635). In this example, beyond the last usable log page slot (which is identified by pointer 645), the pool may grow up to the first used data page slot (which is identified by pointer 665) by persisting initialized log page slots and persistently updating the pointer for the last usable log page slot (645). In this example, the previously uninitialized and unassigned portion of the SSD storage space 600 shown as 650 may be pressed into service to store log pages. In some embodiments, the current log page slot pool may be shrunk down to the position of the last used log page slot (which is identified by pointer) by persisting an update to the pointer for the last reserved log page slot (635).

In the example illustrated in FIG. 6, the current data page slot pool includes the area between the last usable log page slot (which is identified by pointer 645) and the end of SSD storage space 600. In some embodiments, the data page pool may be safely grown to the position identified by the pointer to the last reserved log page slot (635) by persisting an update to the pointer to the last usable log page slot (645). In this example, the previously initialized, but unassigned portion of the SSD storage space 600 shown as 640 may be pressed into service to store data pages. Beyond this, the pool may be safely grown to the position identified by the pointer to the last used log page slot (625) by persisting updates to the pointers for the last reserved log page slot (635) and the last usable log page slot (645), effectively reassigning the portions of SSD storage space 600 shown as 630 and 640 to store data pages, rather than log pages. In some embodiments, the data page slot pool may be safely shrunk down to the position identified by the pointer to the first used data page slot (665) by initializing additional log page slots and persisting an update to the pointer to the last usable log page slot (645).

In embodiments that employ the allocation approach illustrated in FIG. 6, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 6, at startup, all of the log page slots up to the position identified by the pointer to the last reserved log page slot (635) may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

In some embodiments, the cold log zone is populated by copying log records from the hot log zone. In such embodiments, only log records whose LSN is less than or equal to the current unconditional volume durable LSN (VDL) may be eligible to be copied to the cold log zone. When moving log records from the hot log zone to the cold log zone, some log records (such as many CLRs) may not need to be copied because they are no longer necessary. In addition, some additional coalescing of user pages may be performed at this point, which may reduce the amount of copying required. In some embodiments, once a given hot zone log page has been completely written and is no longer the newest hot zone log page, and all ULRs on the hot zone log page have been successfully copied to the cold log zone, the hot zone log page may be freed and reused.

In some embodiments, garbage collection may be done in the cold log zone to reclaim space occupied by obsolete log records, e.g., log records that no longer need to be stored in the SSDs of the storage tier. For example, a log record may become obsolete when there is a subsequent AULR for the same user page and the version of the user page represented by the log record is not needed for retention on SSD. In some embodiments, a garbage collection process may reclaim space by merging two or more adjacent log pages and replacing them with fewer new log pages containing all of the non-obsolete log records from the log pages that they are replacing. The new log pages may be assigned new flush numbers that are larger than the flush numbers of the log pages they are replacing. After the write of these new log pages is complete, the replaced log pages may be added to the free page pool. Note that in some embodiments, there may not be any explicit chaining of log pages using any pointers. Instead, the sequence of log pages may be implicitly determined by the flush numbers on those pages. Whenever multiple copies of a log record are found, the log record present in the log page with highest flush number may be considered to be valid and the others may be considered to be obsolete.

In some embodiments, e.g., because the granularity of space managed within a data zone (sector) may be different from the granularity outside the data zone (storage page), there may be some fragmentation. In some embodiments, to keep this fragmentation under control, the system may keep track of the number of sectors used by each data page, may preferentially allocate from almost-full data pages, and may preferentially garbage collect almost-empty data pages (which may require moving data to a new location if it is still relevant). Note that pages allocated to a segment may in some embodiments be repurposed among the three zones. For example, when a page that was allocated to a segment is freed, it may remain associated with that segment for some period of time and may subsequently be used in any of the three zones of that segment. The sector header of every sector may indicate the zone to which the sector belongs. Once all sectors in a page are free, the page may be returned to a common free storage page pool that is shared across zones. This free storage page sharing may in some embodiments reduce (or avoid) fragmentation.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

In various embodiments, the operations that may be performed on a segment may include writing a DULR or AULR received from a client (which may involve writing the DULR or AULR to the tail of the hot log zone and then updating the user page table), reading a cold user page (which may involve locating the data sectors of the user page and returning them without needing to apply any additional DULRs), reading a hot user page (which may involve locating the data sectors of the most recent AULR for the user page and apply any subsequent DULRs to the user page before returning it), replacing DULRs with AULRs (which may involve coalescing DULRs for a user page to create an AULR that replaces the last DULR that was applied), manipulating the log records, etc. As described herein coalescing is the process of applying DULRs to an earlier version of a user page to create a later version of the user page. Coalescing a user page may help reduce read latency because (until another DULR is written) all DULRs written prior to coalescing may not need to be read and applied on demand. It may also help reclaim storage space by making old AULRs and DULRs obsolete (provided there is no snapshot requiring the log records to be present). In some embodiments, a coalescing operation may include locating a most recent AULR and applying any subsequent DULRs in sequence without skipping any of the DULRs. As noted above, in some embodiments, coalescing may not be performed within the hot log zone. Instead, it may be performed within the cold log zone. In some embodiments, coalescing may also be performed as log records are copied from the hot log zone to the cold log zone.

In some embodiments, the decision to coalesce a user page may be triggered by the size of the pending DULR chain for the page (e.g., if the length of the DULR chain exceeds a pre-defined threshold for a coalescing operation, according to a system-wide, application-specific or client-specified policy)), or by the user page being read by a client.

Figure 7:
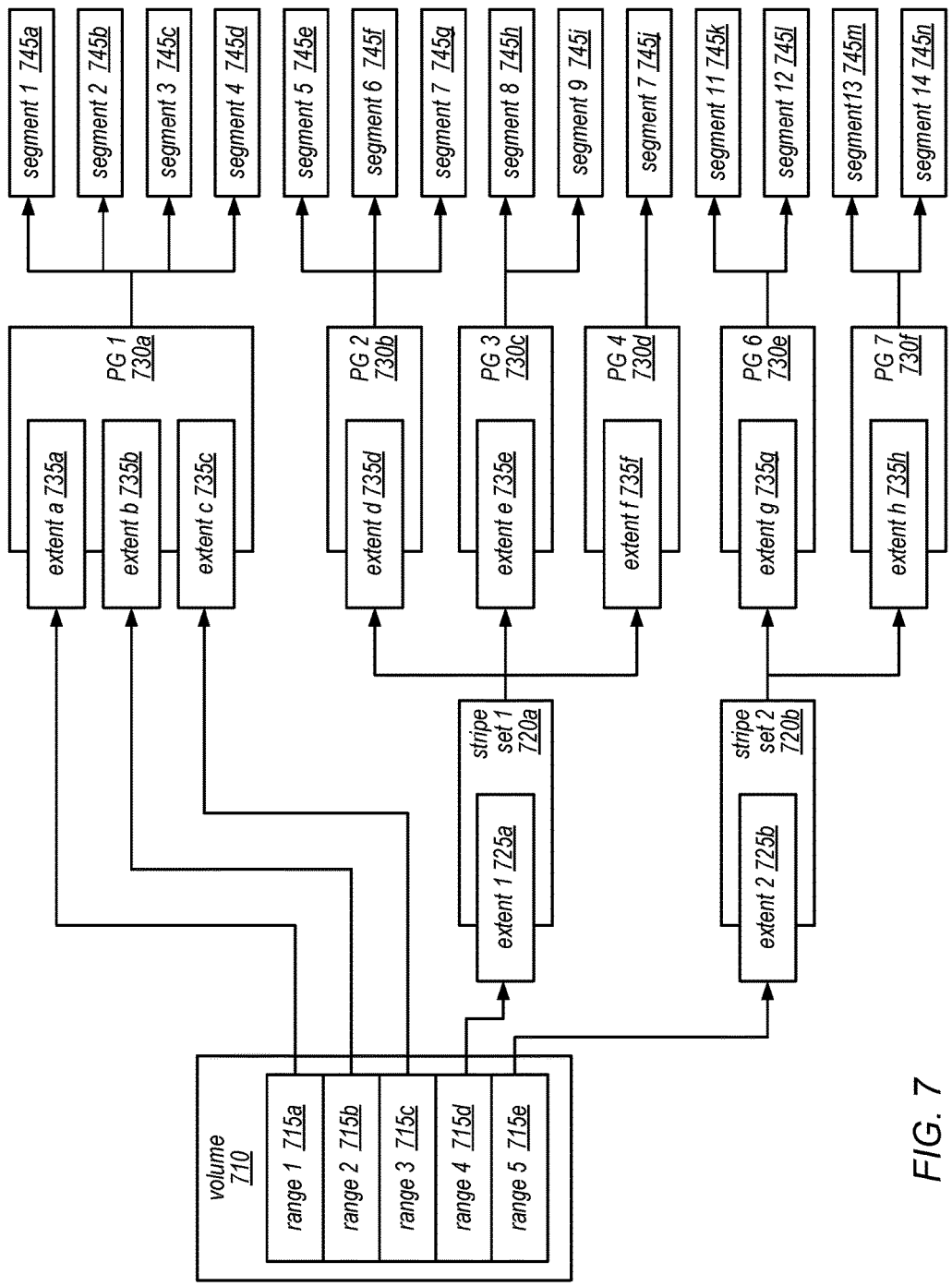
FIG. 7 is a block diagram illustrating an example configuration of a database volume, according to some embodiments.

FIG. 7 is a block diagram illustrating an example configuration of a database volume 710, according to one embodiment. In this example, data corresponding to each of various address ranges 715 (shown as address ranges 715a-715e) is stored as different segments 745 (shown as segments 745a-745n). More specifically, data corresponding to each of various address ranges 715 may be organized into different extents (shown as extents 725a-725b, and extents 735a-735h), and various ones of these extents may be included in different protection groups 730 (shown as 730a-730f), with or without striping (such as that shown as stripe set 720a and stripe set 720b). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (720a) and stripe set 2 (720b) illustrates how extents (e.g., extents 725a and 725b) may be striped into a volume, in some embodiments.

More specifically, in this example, protection group 1 (730a) includes extents a-c (735a-735c), which include data from ranges 1-3 (715a-715c), respectively, and these extents are mapped to segments 1-4 (745a-745d). Protection group 2 (730b) includes extent d (735d), which includes data striped from range 4 (715d), and this extent is mapped to segments 5-7 (745e-745g). Similarly, protection group 3 (730c) includes extent e (735e), which includes data striped from range 4 (715d), and is mapped to segments 8-9 (745h-745i); and protection group 4 (730d) includes extent f (735f), which includes data striped from range 4 (715d), and is mapped to segment 10 (745j). In this example, protection group 6 (730e) includes extent g (735g), which includes data striped from range 5 (715e), and is mapped to segments 11-12 (745k-745l); and protection group 7 (730f) includes extent h (735h), which also includes data striped from range 5 (715e), and is mapped to segments 13-14 (745m-745n).

Please note that the striping, erasure coding, and other storage schemes for the database volume apply to the user data space of the database volume, not the log records pertaining to the volume. Log records are segmented across protection groups according to the partition of the volume maintained at the protection group. For example, log records indicating updates to the user data striped from range 5 maintained in PG 6, pertain to the user data in PG 6.

Figure 8:
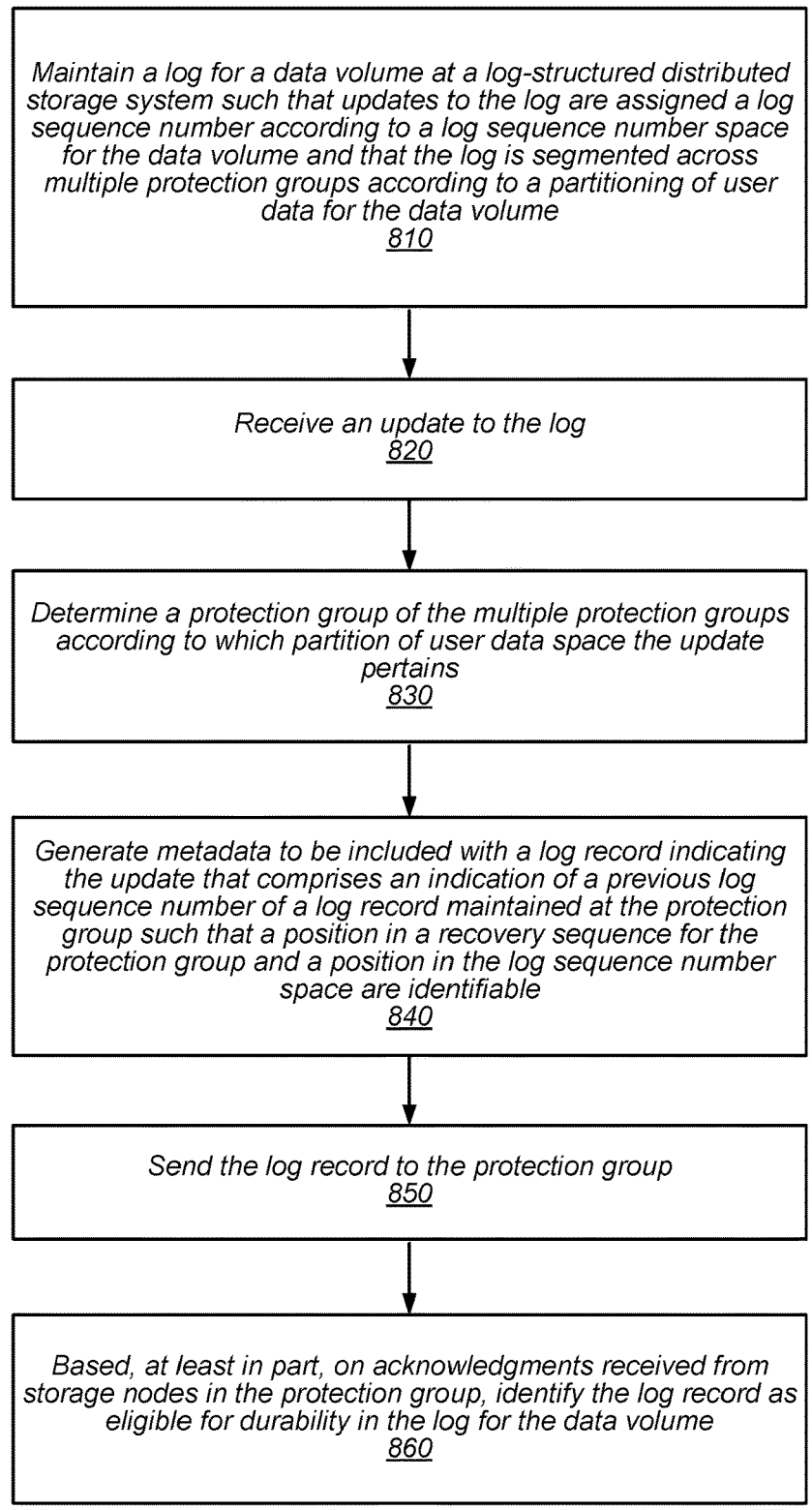
FIG. 8 is a high-level flowchart illustrating a technique for implementing log-structured distributed storage using a single log sequence number space, according to some embodiments.

The distributed storage service and database service discussed in FIGS. 2 through 7 above represent some of the various different interactions between a database system and a log-structured distributed storage system using a single log sequence number space. FIG. 8 is a high-level flowchart illustrating a technique for implementing log-structured distributed storage using a single log sequence number space, according to some embodiments. Various different storage clients, such as different database systems, may maintain a data volume in a log-structured distributed storage system.

As indicated at 810, a log for a data volume may be maintained at a log-structured distributed storage system, in various embodiments. A data volume may be user data stored for a storage client, such as a database system(e.g., database tables, records or entries, metadata describing the database, such as data dictionaries, transaction tables, and/or index structures). The user data space may be the logical arrangement of the user data in the volume, which may be partitioned among protection groups. For example, as FIG. 7 illustrates, different byte or page ranges of the data volume may be maintained by different protection groups. The log maintained for the data volume may indicate changes or updates to the data and/or metadata for the data volume. For example, in some embodiments, the data volume may be composed of data pages, and the changes or updates to the data volume may be log records indicating a change or update to a particular data page in the data volume.

As discussed above, the changes or updates to the log may be log records that are assigned a log sequence number according to a log sequence number space for the data volume, in some embodiments. For instance, when a log record is generated, a log sequence number from the log sequence number space may be selected. The log sequence number space may be, in various embodiments, monotonically increasing. The log sequence number selected for a log record may not be tightly packed or contiguous with the prior log sequence number in the log sequence number space for the data volume. For instance, the sequence of log records in the number space in order may be sparse, such as 22010, 22027, 22030, 22031, 22039, etc . . . . In some other embodiments, the log sequence numbers may be contiguous, such as 22010, 22011, 22012, 22013, etc . . . .

Also indicated at 810, the log may be segmented across multiple protection groups according to the partitioning of user data for the data volume. Segmenting the log may occur by individual log record, and as such, the term segment as applied to the log may not be construed as to performing striping of log records or assigning ranges of log records to protection groups. Instead log records pertaining to a specific partition of user data may be co-located at the same protection group. Thus the number of log records, or ranges of LSNs within a segment of the log for the data volume maintained at a protection group may widely vary. Protection groups, as discussed above with regard to FIGS. 2-7, may include one or more storage nodes providing redundant storage for a given segment of the log.

As indicated at 820, an update to the log for the data volume may be received, in some embodiments. The update to the log may be part of an update to the data, such as set of updates or changes initiated by a user or system transaction performed by the storage client. A log record may be generated to indicate the update and assigned a log sequence number as indicated above.

In various embodiments, in response to receiving the update, a protection group of the multiple protection groups maintaining the log for the data volume may be determined, according to which partition of user data space the update pertains, as indicated at 830. As noted above, mapping information may be maintained, at a data node or other application (e.g., client-side storage driver 425 described above with regard to FIG. 4) that provides locations of different partitions of the user data space among the protection groups. For example, if the update pertains to data page 12111, then the mapping information may indicate that data page 12111 is maintained at protection group A. The different storage nodes that are members of the protection group may also be included in the mapping information such that log records may be sent to multiple storage nodes in the protection group, in some embodiments, in order to satisfy a write quorum requirement for the log record.

In some embodiments, as indicated at 840, metadata to be included with the log record indicating the update may be generated that indicates a previous log sequence number of a log record maintained at the determined protection group. This indication may be a location, address, pointer, or simply the LSN value. In some embodiments, as storage nodes in a protection group receive log records with the included metadata, in-memory data structures, such as indexes, lists, or sequences may be updated to include the new log record as well as its position relative to the previous log record maintained at the protection group. Over time, the sequence of log records maintained at a protection group may be determined, as each log record may point to a different log record. This sequence may be a recovery sequence, which may be used to determine a completion point of the protection group in order to perform recovery for a database. FIG. 10, discussed below, provides further examples of how the generated metadata may be used to perform recovery.

Additional metadata may be included with the log record, in at least some embodiments, that indicates the previous log sequence number in the log sequence number space for the data volume. For example, as noted above, log sequence numbers may be sparse. For sparse log sequence numbers it may not be apparent based on the log sequence number alone whether or not another log record with a sequence number has been committed. For instance, LSN 22245 and LSN 22249 may be contiguous in a sparse ordering of LSNs, or there may be another one or more log records with LSNs in between. If metadata were included with the log record of LSN 22249 that indicates that log record LSN 22245 is the previous log record in the sequence, then it may be determined that all log records between LSN 22249 and LSN 22245 have been committed. FIG. 9, discussed below, provides further details of log recovery where such determinations may be performed.

As indicated at 850, the log record may be sent to the protection group in order to be committed to the log, in some embodiments. The protection group, as previously discussed, may in various embodiments be implemented by one or more storage nodes. By sending the log record to the protection group, the log record may be sent to different ones (or all of) the storage nodes in a protection group. A protection group may implement policies or requirements in order for a log record to be considered durably or persistently stored. For example, in some embodiments, a write quorum requirement may determine that a certain number of storage nodes (e.g., ⅗ nodes, ⅗ nodes, ⅔ nodes in availability zone A and ⅔ nodes in availability zone B, etc . . . ) in a protection group may have to receive and persist a log record for it to be persistently stored. Write quorum requirements or other protection group policies for durability or persistence may vary based on storage client requirements.

Based, at least in part, on acknowledgments received from storage nodes in the protection group, the log record may be identified as committed to the log for the data volume, as indicated at 860. For example, in some embodiments, a database, like database system 400 described above with regard to FIG. 4, may determine whether acknowledgments received from storage nodes in a protection group meet a write quorum requirement for the log record. Identifying the log record as eligible for durability may include acknowledging to a client of the database, such as a user, system, or device, that the log record has been made durable, like the database query response 517 discussed above with regard to FIG. 5. Log records that are eligible for durability may be identified as durably persisted at the protection group. Upon a determination that log records in the log sequence number space prior to the eligible log record are also durable, the log record that is eligible for durability may be considered durability committed to the log (e.g., to be persisted in the event of recovery).

One advantage of log-structured distributed storage is the updates to the log for the data volume are made consistent across the log for the entire data volume without communicating the log record to other protection groups in the distributed storage system, reducing latency for committing updates to the log. Resolving differences among log records committed at different protection groups may be resolved at recovery time instead. Upon a failure of the storage client (e.g., database head node, such as database engine head node 420 in FIG. 4, head node 520 in FIG. 5), a recovery point for the entire log may be determined that maintains consistent view of the data volume. A storage client, such as a database system, engine, head node, or other database component may perform the techniques illustrated below. Likewise a recovery module or service, such as may be implemented by the log-structured distributed storage system may also perform the various discussed techniques. FIG. 9 is a high-level flowchart illustrating a technique for recovery in log-structured distributed storage using a single log sequence number space, according to some embodiments.

As indicated at 910, a failure of a storage client may be recovered from, in various embodiments. Failure may include a system or power failure, of a computing system or device, such as computing system 1200 in FIG. 12. In some embodiments, failure may be a process implementing a virtual instance implementing the database that is frozen or restarted. The same system or virtualized instance may recover from the database failure, or a new virtualized instance created and/or a new computing system started as the database.

Upon recovery from the failure, candidate log records for recovery may be requested from each of multiple protection groups storing the log for the data volume may be requested, as indicated at 920. The requests for candidate log records may be sent to one or more storage nodes in the protection group. Further coordination or evaluations may be made at a storage client node or recovery service performing recovery if, for instance, candidate records from different storage nodes in the same protection group are sent. As discussed above, the log for the data volume may be segmented among the protection groups according to a partition of the user data. Each protection group may maintain a segment of log records, a log specific to the protection group, from which volume-wide recovery may be performed. Candidate log records may be log records that indicate possible recovery points for the log for the data volume. FIG. 10 is a high-level flowchart illustrating techniques for selecting candidate log records for log recovery, according to some embodiments.

As indicated at 1010, the request for a candidate log records may be received at a protection group. Based, at least in part, on metadata indicating a previous log sequence number for each of the log records maintained at the protection group, different log records may be selected according to an identified position in recovery sequence for the protection group. A recovery sequence for the protection group may identify an ordering of log records maintained at the protection group. As log records may be persisted a protection group based on the partition of user data maintained at the protection group, the log sequence number space for the data volume, may be insufficient to discern whether a particular log record is missing or not committed/persisted at a particular protection group. FIG. 11 is a block diagram illustrating a log segmented according to partitions of user data space in log-structured distributed storage, according to some embodiments. For example, protection group 1150*a* maintains LSN 1108 and LSN 1104. It may not be discernible based on these LSNs that no other log records with LSNs between these log records are to be persisted at protection group 1150*a*. Thus, metadata for the log records, such as metadata generated above at element 840 in FIG. 8, may be used in the evaluation to select candidate log records.

The metadata for log records may, in various embodiments, be used to generate an in-memory data structure at a storage node indicating links between the log records of the log segment maintained at the respective protection group. For instance, FIG. 11 illustrates previous log sequence number indicators 1152*a*. LSN 1108 back links to LSN 1104, which in turn back links to LSN 1103 and to LSN 1102. Such metadata may establish the recovery sequence for the protection group. Based on the recovery sequence, in some embodiments, a completion point for the respective protection group may be determined. A completion point may be determined by traversing the links between the log records in the in-memory data structure to locate the first break or gap in the sequence. For protection group, 1150 the first break is illustrated after LSN 1108. The completion point for the protection group may be identified as the LSN prior to the break, LSN 1108. Similar techniques based on previous log sequence number indicators 1152*b* may yield a completion point for protection group 1150*b* as LSN 1117, and based on previous log sequence number indicators 1152*c* may yield a completion point for protection group 1150*c* as LSN 1115.

Upon determining a completion point for a protection group, LSNs below a protection group may be considered eligible candidate log records for recovery. In at least some embodiments, all eligible log records may be sent as candidate log records for recovery. However, in some embodiments, eligible log records may be filtered down to a subset of eligible log records. In some embodiments, a protection group may be aware of an LSN value that is complete across all of the protection groups. For example, as discussed above with regard to FIGS. 2-5, a storage client head node may send an unconditional volume LSN indicator to protection groups, indicating an LSN value that is complete across all protection groups. Using this volume-wide completion point as a floor value, eligible log records equal to or below the floor LSN value may filtered out of the candidate log records. Other types of filtering may be performed alone, or in combination with the floor value. For example, in some embodiments, as indicated at 1030, selected log records (i.e. eligible log records) may be removed that do not indicate a complete system transaction. For instance, in some embodiments, log records that are the last log record associated with a system transaction may be marked with a consistency point indicator. These consistency point LSNs may be, in some embodiments, the only eligible log records for candidate log records. Thus, as indicated at 1030, those eligible log records not indicated as consistency points may be removed from the candidate log records. Once the selected (i.e., eligible) log records have been identified, and in some embodiments filtered down, the selected log records may be sent as the candidate log records for the protection group for log recovery, as indicated at 1040.

Turning back to FIG. 9, upon receipt of the candidate log records or metadata for the candidate log records from each of the protection groups maintaining the log for the data volume (e.g., a listing of LSN values for the candidate log records, pointers or indicators to prior log records at the protection group and/or in the log sequence number space for the entire volume), the candidate log records may be evaluated to identify a recovery point in the log for the data volume according to the log sequence number space, as indicated at 930. A recovery point for the log is a completion point of the log that provides a consistent view of the data volume. The candidate log records may each indicate LSN values that may possibly indicate the recovery point. Similar to determining the completion point for a protection group, evaluating log records to determine a recovery point may begin by following the log sequence numbers of the candidate log records in order to determine a first break (or highest LSN)in the log sequence number space. In some embodiments, contiguously assigned log records may inherently determine the recovery point. For example, if the candidate log records received from protection groups 1150*a*, 1150*b*, and 1150*c* include LSN 1108, LSN 1109, LSN 1110, LSN 1111, LSN 1112, LSN 1113, LSN 1114, LSN 1115, and LSN 1117, the first break may be between LSN 1115 and LSN 1117. The determined recovery point may be identified as LSN 1115, as it is known that a log record between LSN 1115 and LSN 1117 since log sequence numbers are contiguously assigned. However, as discussed above with regard to FIG. 8, in some embodiments, log sequence numbers assigned from the log sequence number space for the data volume may be sparse. Metadata may be included with candidate log records that indicates previous log sequence numbers in the log sequence number space in the data volume, in some embodiments. As the storage client has recovered from failure, this information may not be available to the storage client (or other recovery module) without the metadata. FIG. 11 illustrates such metadata as log sequence number space previous LSN indicators 1140, illustrated by the dashed lines. Consider, for example, the same scenario of candidate log records, but assume that the LSNs are sparsely assigned. A pointer, indicator, other mechanism for may indicate point in the log sequence number space where the gap or break occurs as it may not be known whether a break between two sparsely assigned LSNs occurs based on the LSNs alone.

As indicated at 940, a view of the data volume may be made available for access requests consistent with the recovery point in the log for the data volume, in various embodiments. For example, when servicing access requests, such as read requests for the data volume, log records may only be applied up to the recovery point (in addition to any new log records generated after recovery which may also be applied). Such a view of the data volume may be made available at the protection groups servicing the access requests, in some embodiments, by applying the log records locally at the protection group to generate the requested data. In at least some embodiments, the recovery point may indicate a truncation point or range in the log, excluding log records with LSNs within the truncated range from the view of the data volume. This truncation point (along with the range of excluded log records) may be sent to and persisted at each of the protection groups so that when, as discussed in the example above of applying log records at the storage nodes, log records are applied at the protection groups, the truncated log records may not be applied.

Figure 12:
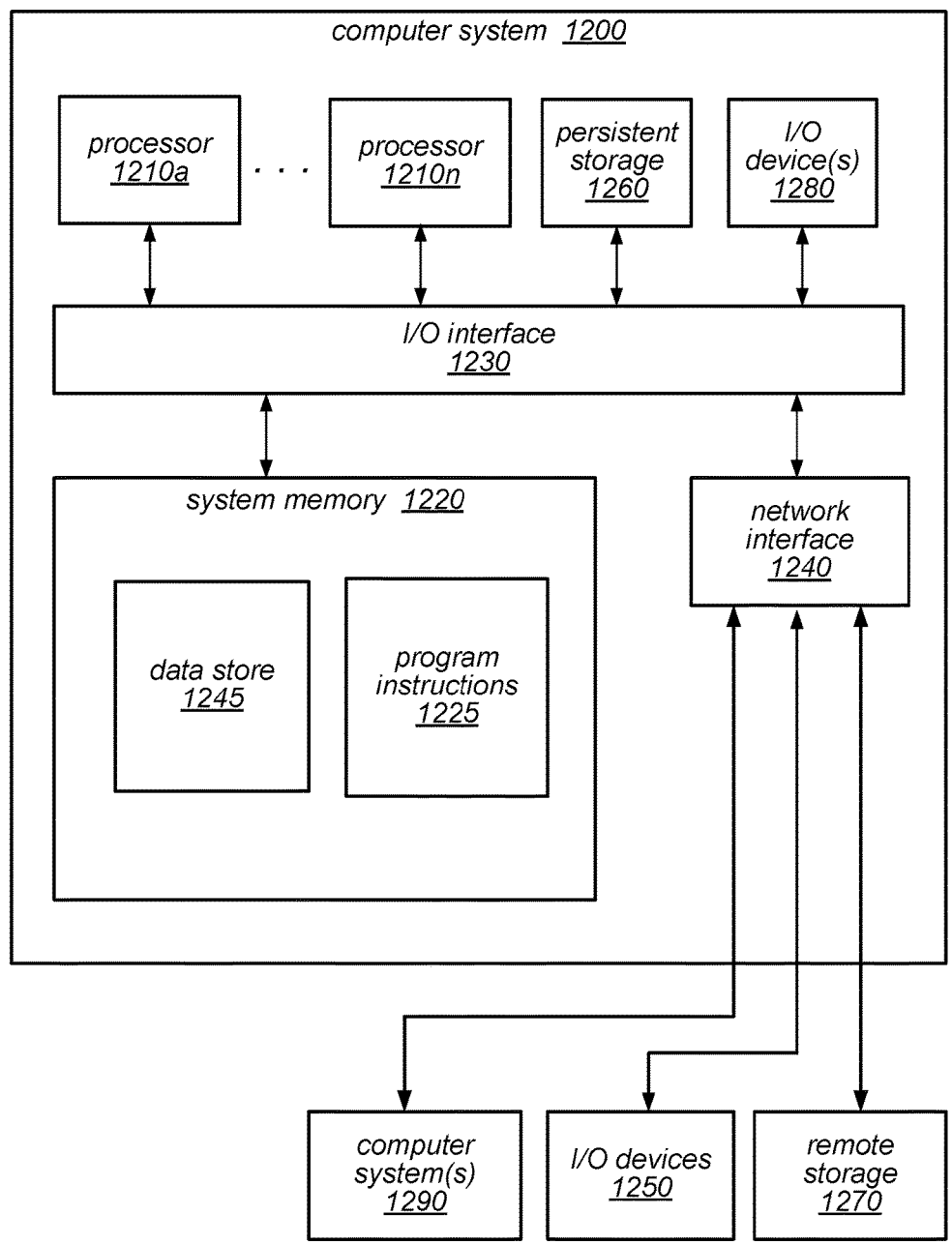
FIG. 12 is an example computer system, according to various embodiments.

FIG. 12 is a block diagram illustrating a computer system configured to implement at least a portion of the database systems described herein, according to various embodiments. For example, computer system 1200 may be configured to implement a database engine head node of a database tier, or one of a plurality of storage nodes of a separate distributed storage system that stores databases and associated metadata on behalf of clients of the database tier, in different embodiments. Computer system 1200 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1200 includes one or more processors 1210 (any of which may include multiple cores, which may be single or multi-threaded) coupled to a system memory 1220 via an input/output (I/O) interface 1230. Computer system 1200 further includes a network interface 1240 coupled to I/O interface 1230. In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. The computer system 1200 also includes one or more network communication devices (e.g., network interface 1240) for communicating with other systems and/or components over a communications network (e.g. Internet, LAN, etc.). For example, a client application executing on system 1200 may use network interface 1240 to communicate with a server application executing on a single server or on a cluster of servers that implement one or more of the components of the database systems described herein. In another example, an instance of a server application executing on computer system 1200 may use network interface 1240 to communicate with other instances of the server application (or another server application) that may be implemented on other computer systems (e.g., computer systems 1290).

In the illustrated embodiment, computer system 1200 also includes one or more persistent storage devices 1260 and/or one or more I/O devices 1280. In various embodiments, persistent storage devices 1260 may correspond to disk drives, tape drives, solid state memory, other mass storage devices, or any other persistent storage device. Computer system 1200 (or a distributed application or operating system operating thereon) may store instructions and/or data in persistent storage devices 1260, as desired, and may retrieve the stored instruction and/or data as needed. For example, in some embodiments, computer system 1200 may host a storage system server node, and persistent storage 1260 may include the SSDs attached to that server node.

Computer system 1200 includes one or more system memories 1220 that are configured to store instructions and data accessible by processor(s) 1210. In various embodiments, system memories 1220 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1220 may contain program instructions 1225 that are executable by processor(s) 1210 to implement the methods and techniques described herein. In various embodiments, program instructions 1225 may be encoded in platform native binary, any interpreted language such as Java™ byte-code, or in any other language such as C/C++, Java™, etc., or in any combination thereof. For example, in the illustrated embodiment, program instructions 1225 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1225 may implement multiple separate clients, server nodes, and/or other components.

In some embodiments, program instructions 1225 may include instructions executable to implement an operating system (not shown), which may be any of various operating systems, such as UNIX, LINUX, Solaris™, MacOS™, Windows™, etc. Any or all of program instructions 1225 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1200 via I/O interface 1230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1240.

In some embodiments, system memory 1220 may include data store 1245, which may be configured as described herein. For example, the information described herein as being stored by the database tier (e.g., on a database engine head node), such as a transaction log, an undo log, cached page data, or other information used in performing the functions of the database tiers described herein may be stored in data store 1245 or in another portion of system memory 1220 on one or more nodes, in persistent storage 1260, and/or on one or more remote storage devices 1270, at different times and in various embodiments. Similarly, the information described herein as being stored by the storage tier (e.g., redo log records, coalesced data pages, and/or other information used in performing the functions of the distributed storage systems described herein) may be stored in data store 1245 or in another portion of system memory 1220 on one or more nodes, in persistent storage 1260, and/or on one or more remote storage devices 1270, at different times and in various embodiments. In general, system memory 1220 (e.g., data store 1245 within system memory 1220), persistent storage 1260, and/or remote storage 1270 may store data blocks, replicas of data blocks, metadata associated with data blocks and/or their state, database configuration information, and/or any other information usable in implementing the methods and techniques described herein.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems 1290 (which may implement one or more storage system server nodes, database engine head nodes, and/or clients of the database systems described herein), for example. In addition, network interface 1240 may be configured to allow communication between computer system 1200 and various I/O devices 1250 and/or remote storage 1270. Input/output devices 1250 may, in some embodiments, include one or more display terminals, keyboards, keypads, touchpads, scanning devices, voice or optical recognition devices, or any other devices suitable for entering or retrieving data by one or more computer systems 1200. Multiple input/output devices 1250 may be present in computer system 1200 or may be distributed on various nodes of a distributed system that includes computer system 1200. In some embodiments, similar input/output devices may be separate from computer system 1200 and may interact with one or more nodes of a distributed system that includes computer system 1200 through a wired or wireless connection, such as over network interface 1240. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol. In various embodiments, computer system 1200 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a memory to store program instructions which, if performed by at least one processor, cause the at least one processor to perform a method to at least:
  detect a failure of a storage client of a distributed data store that stores a log for a data volume, wherein the log is segmented across a plurality of different groups of storage nodes that store different partitions of the data volume, wherein at least one group of storage nodes provides redundant storage for a given segment of the log, and wherein the log comprises a plurality of log records assigned respective log sequence numbers according to a log sequence number space for the data volume; and obtain from each of the plurality of groups one or more log records that indicate possible recovery points for the log;

evaluate the assigned log sequence numbers for the obtained log records to identify a recovery point in the log for the data volume according to the log sequence number space; and make a view of the data volume available for access requests consistent with the recovery point in the log for the data volume.

2. The system of claim 1,
wherein to obtain from each of the plurality of groups one or more log records that indicate possible recovery points for the log, comprises send a request for the one or more log records that indicate the possible recovery points for the logs to at least one storage node in each of the groups of storage nodes;
wherein the method further comprises:
for each of the groups of storage nodes:
receive the request at the at least one storage node;
based, at least in part, on metadata indicating a previous log sequence number for log records maintained at the group of storage nodes, select, by the at least one storage node, one or more candidate log records of the log records maintained at the group of storage nodes according to a recovery sequence for the log records maintained at the group of storage nodes; and
send, from the at least one storage node, respective metadata for the one or more candidate log records in response to the request for the one or more log records.

3. The system of claim 2, wherein the method further comprises:
for each of the groups of storage nodes, remove, by the at least one storage node, at least one of the candidate log records that do not indicate completion of a system transaction.

4. The system of claim 2, wherein to select the one or more candidate log records of the log records comprises traverse one or more links between the log records in the metadata to locate a first break in the recovery sequence.

5. The system of claim 2, wherein the selection of the one or more candidate log records is based, at least in part, on a volume-wide recovery point in the metadata.

6. The system of claim 1, wherein to evaluate the assigned log sequence numbers for the obtained log records to identify the recovery point comprises determine a break in the log sequence number space for the obtained log records.

7. The system of claim 1, wherein the memory and the at least one processor are implemented as part of a recovery service for a network-based database service.

8. A method, comprising:
detecting a failure of a storage client of a distributed data store that stores a log for a data volume, wherein the log is segmented across a plurality of different groups of storage nodes that store different partitions of the data volume, wherein at least one group of storage nodes provides redundant storage for a given segment of the log, and wherein the log comprises a plurality of log records assigned respective log sequence numbers according to a log sequence number space for the data volume; and obtaining from each of the plurality of groups one or more log records that indicate possible recovery points for the log;

evaluating the assigned log sequence numbers for the obtained log records to identify a recovery point in the log for the data volume according to the log sequence number space; and making a view of the data volume available for access requests consistent with the recovery point in the log for the data volume.

9. The method of claim 8,
wherein the obtaining from each of the plurality of groups one or more log records that indicate possible recovery points for the log, comprises sending a request for the one or more log records that indicate the possible recovery points for the logs to at least one storage node in each of the groups of storage nodes;
wherein the method further comprises:
for each of the groups of storage nodes:
receiving the request at the at least one storage node;
based, at least in part, on metadata indicating a previous log sequence number for log records maintained at the group of storage nodes, selecting, by the at least one storage node, one or more candidate log records of the log records maintained at the group of storage nodes according to a recovery sequence for the log records maintained at the group of storage nodes; and
sending, from the at least one storage node, respective metadata for the one or more candidate log records in response to the request for the one or more log records.

10. The method of claim 9, further comprising:
for each of the groups of storage nodes, removing, by the at least one storage node, at least one of the candidate log records that do not indicate completion of a system transaction.

11. The method of claim 9, wherein the selecting the one or more candidate log records of the log records comprises traversing one or more links between the log records in the metadata to locate a first break in the recovery sequence.

12. The method of claim 9, wherein the selecting of the one or more candidate log records is based, at least in part, on a volume-wide recovery point in the metadata.

13. The method of claim 8, wherein the evaluating the assigned log sequence numbers for the obtained log records to identify the recovery point comprises determining a break in the log sequence number space for the obtained log records.

14. The method of claim 8, wherein the detecting, the obtaining, the evaluating and the making are performed by a recovery service for a network-based database service.

15. A non-transitory, computer-readable storage medium, comprising program instructions that when executed by at least one computing device cause the at least one computing device to implement:
detecting a failure of a storage client of a distributed data store that stores a log for a data volume, wherein the log is segmented across a plurality of different groups of storage nodes that store different partitions of the data volume, wherein at least one group of storage nodes provides redundant storage for a given segment of the log, and wherein the log comprises a plurality of log records assigned respective log sequence numbers according to a log sequence number space for the data volume; and obtaining from each of the plurality of groups one or more log records that indicate possible recovery points for the log;

evaluating the assigned log sequence numbers for the obtained log records to identify a recovery point in the log for the data volume according to the log sequence number space; and making a view of the data volume available for access requests consistent with the recovery point in the log for the data volume.

16. The non-transitory, computer-readable storage medium of claim 15, wherein, in obtaining from each of the plurality of groups one or more log records that indicate possible recovery points for the log, the program instructions cause the at least one computing device to implement sending a request for the one or more log records that indicate the possible recovery points for the logs to at least one storage node in each of the groups of storage nodes;

wherein the program instructions cause the at least one computing device to further implement:

for each of the groups of storage nodes:

receiving the request at the at least one storage node;

based, at least in part, on metadata indicating a previous log sequence number for log records maintained at the group of storage nodes, selecting, by the at least one storage node, one or more candidate log records of the log records maintained at the group of storage nodes according to a recovery sequence for the log records maintained at the group of storage nodes; and sending, from the at least one storage node, respective metadata for the one or more candidate log records in response to the request for the one or more log records.

17. The non-transitory, computer-readable storage medium of claim 16, wherein the program instructions further cause the at least one computing device to implement:

for each of the groups of storage nodes, removing, by the at least one storage node, at least one of the candidate log records that do not indicate completion of a system transaction.

18. The non-transitory, computer-readable storage medium of claim 16, wherein, in selecting the one or more candidate log records of the log records, the program instructions cause the at least one computing device to implement traversing one or more links between the log records in the metadata to locate a first break in the recovery sequence.

19. The non-transitory, computer-readable storage medium of claim 15, wherein, in evaluating the assigned log sequence numbers for the obtained log records to identify the recovery point, the program instructions cause the at least one computing device to implement determining a break in the log sequence number space for the obtained log records.

20. The non-transitory, computer-readable storage medium of claim 15, wherein the at least one computing device is implemented as part of a recovery service for a network-based database service.

* * * * *